United States Patent [19]

Fuhrman

[11] Patent Number: 5,699,140
[45] Date of Patent: Dec. 16, 1997

[54] JEWELRY EYEGLASS HOLDER

[76] Inventor: Esther Fuhrman, Riva Pointe-1022 Harbor Blvd., Weehawken, N.J. 07087

[21] Appl. No.: 595,766

[22] Filed: Feb. 2, 1996

[51] Int. Cl.$^6$ .............................. G02C 3/00; G02C 1/00; A44C 13/00
[52] U.S. Cl. .............................. 351/155; 351/158; 63/11; 24/3 C
[58] Field of Search .................. 351/51, 158, 155; 63/1.1, 2, 20; 24/3 C

[56] References Cited

U.S. PATENT DOCUMENTS 5,305,934  4/1994  Grey .............................. 63/1.1

OTHER PUBLICATIONS

Catalogue page from J&B Associates brochure "Eyeglass Holders".

*Primary Examiner*—Huy Mai
*Attorney, Agent, or Firm*—Cobrin Gittes & Samuel

[57] ABSTRACT

A jewelry eyeglass holder having a loop that is movable about a hinge between hidden and exposed positions. In the hidden position, the loop is behind the rear of the design portion of the jewelry and in the exposed position, it hangs downwardly. Eyeglasses may hang from the loop in a balanced manner. The jewelry eyeglass holder also has a pin for securing the same to clothing.

12 Claims, 10 Drawing Sheets

JEWELRY EYEGLASS HOLDER

BACKGROUND OF THE INVENTION

The present invention relates to jewelry for holding eyeglasses in a folded position.

Jewelry eyeglass holders are known that have a specially formed loop hanging downwardly from a jewelry pin. While the loop is partially covered by the eyeglasses while they are held, the loop is fixed in position and thereby remains visible even when the eyeglasses are not being held. Unfortunately, the loop, which is not integrated into the jewelry pin design itself, is conspicuous and may detract from the appearance of the jewelry pin when the eyeglasses are not being held. In any event, it would be desirable to give the wearer the option of hiding the loop from view when eyeglasses are not being held and yet make it accessible for use when eyeglasses are to be held.

SUMMARY OF THE INVENTION

One aspect of the invention resides in a piece of jewelry having an eyeglass holder incorporated into the jewelry design itself so as to blend in with the rest of the design and yet hold the junction between the glass rim and the folded post of the eyeglasses. The eyeglass holder defines a loop.

One aspect of the invention resides in a piece of jewelry having an ornamental design portion and also having an eyeglass holder movable between a hidden position, which is along the backside of the ornamental portion and hidden from view from the front, and an exposed position, which entails hanging the eyeglass holder downwardly from the ornamental design portion in plain sight. The jewelry piece also has a pin to secure the jewelry piece to clothing. The junction between the rim of the eyeglass and the folded post rests on the inner edge of the holder. The eyeglass holder may be a clip having a loop.

BRIEF DESCRIPTION OF THE DRAWING

For a better understanding of the present invention, reference is made to the following description and accompanying drawings, while the scope of the invention is set forth in the appended claims.

FIG. 20 shows the loop positioned for insertion of its stem into a pivotable receptacle and hanging downwardly in its exposed position. FIG. 21 shows such insertion. FIG. 22 shows the position of the loop after it has been rotated about the pivot in the pivotable receptacle to the hidden position behind the decorative portion.

DESCRIPTION OF THE PREFERRED EMBODIMENT

Figure 1:
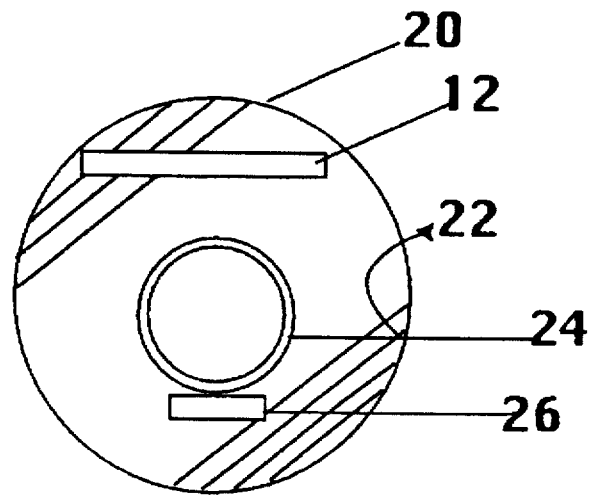
FIGS. 1 and 2 are schematic representations of rear views in progression of a jewelry pin in accordance with a second embodiment having an eyeglass holder movable between hidden (behind the pin) and exposed (hanging downwardly) positions.
Figure 2:
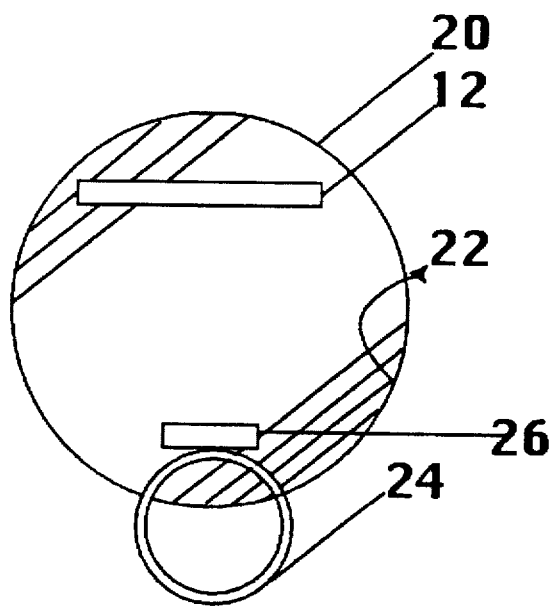

FIG. 1 shows a jewelry pin 20 having design portion 22, a pin portion 12, and an eyeglass holder 24 that is movable between a hidden position as shown in FIG. 1 to an exposed position as shown in FIG. 2. In the exposed position of FIG. 2, the eyeglass holder 24 hangs downward from the design portion 22. The eyeglass holder portion 24 is connected to the rear face of the design portion 22 by a hinge connection 26.

The hinge connection 26 is of a conventional hinge type of a clip that is constructed so that when closing the eyeglass holder portion to the hidden position, a locking plate rotates about the hinge to press against a resilient element that retains the locking plate in position. By manually rotating the eyeglass holder portion from the hidden portion to the exposed position, however, the locking plate rotates to eventually free itself by clearing the resilient element. The locking plate is formed to extend the full length of the hinge and at an angle relative to the eyeglass holder portion. The resilient element is situated between the hinge and the rear of the design portion 22.

The eyeglass holder 24 may define a loop of any closed geometric shape. The advantage of a closed geometric shape is that eyeglasses are unlikely to fall off the loop inadvertently, as may be the case if the loop were open.

Figure 3:
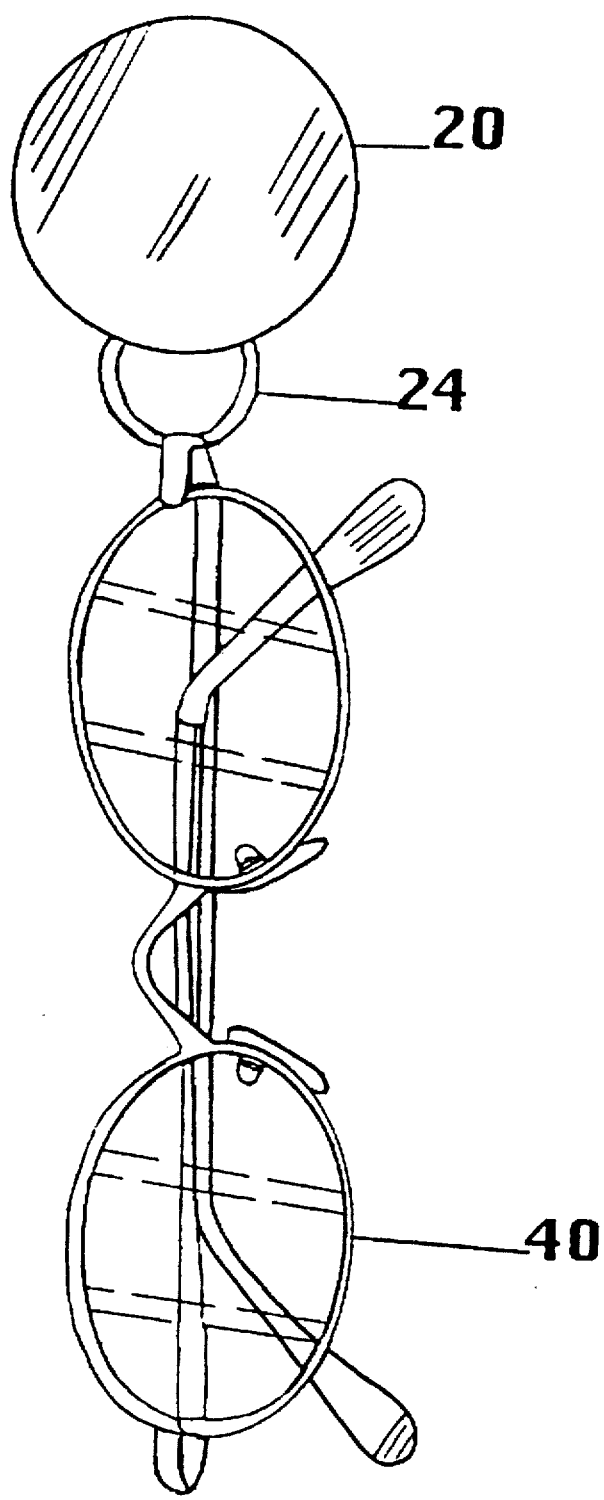
FIG. 3 is a schematic representation of an elevational front view of the pin of the type of FIG. 2 but further showing eyeglasses being hung and the pin secured to clothing.
Figure 4:
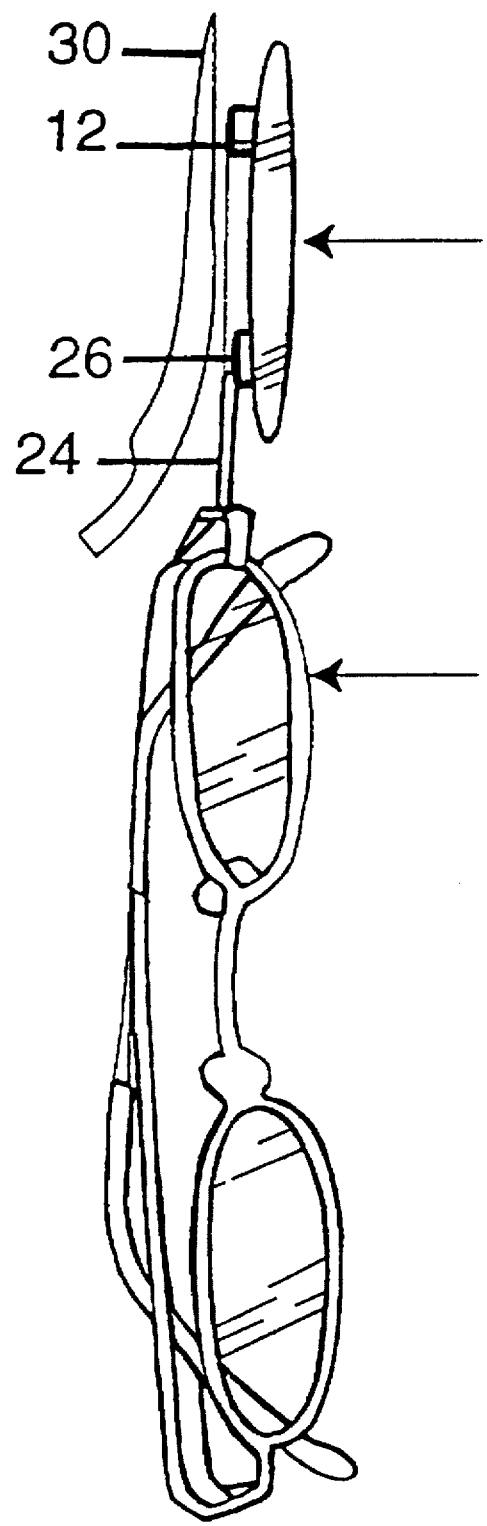
FIG. 4 is a schematic representation of an elevational side view of that of FIG. 3, but further showing the pin secured to clothing such as a dress.

FIGS. 3 and 4 show the jewelry pin 20 of FIGS. 1–2 being secured to clothing 30 such as a scarf in a conventional manner, i.e., through the pin portion 12. Also, eyeglasses 40 are shown hanging downward from the downwardly extending loop clip portion 24.

Figure 5:
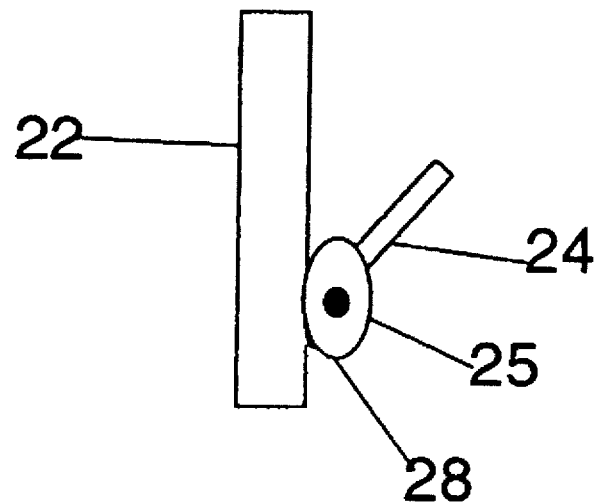
FIG. 5 is a schematic representation of a side view of the jewelry pin of FIGS. 1–2 with the eyeglass holder positioned in an intermediate position between the fully closed hidden position and fully open exposed position.
Figure 6:
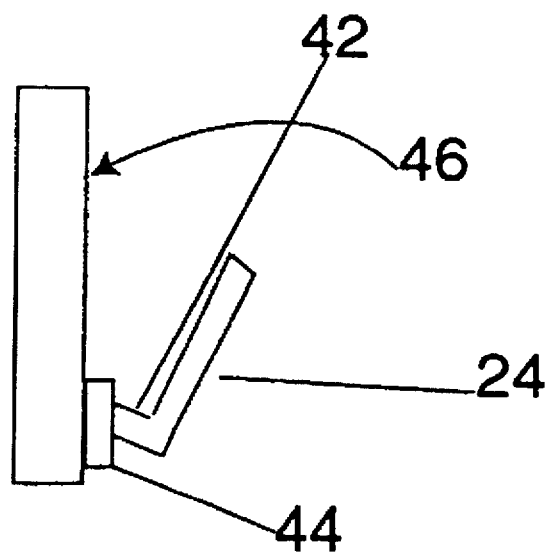
FIG. 6 is a schematic representation as in FIG. 5 but with a hinge plate taken away.

FIGS. 5 and 6 show the hinge connection 26 in greater detail as viewed from one side that mirrors that of the opposite side. In FIG. 5, the eyeglass holder portion 24 is shown with an end 25 protruding through an opening in the hinge plate 28. In FIG. 6, the hinge plate 28 is taken away to show that the eyeglass holder 24 has an angled stub portion 42 that presses against a resilient element 44 as the eyeglass holder 24 is swung in a clockwise direction from the position shown in the direction of the direction arrow 46. The resilient element 44 retains the eyeglass holder 24 in the fully hidden (closed) position behind the design portion 22. If the eyeglass holder 24 is swung outwardly in a counterclockwise direction that is opposite to that of the direction arrow 46, the angled stub portion 42 will eventually clear the resilient element 44 and thus enable it to hang downward for accommodating eyeglasses.

Figure 7:
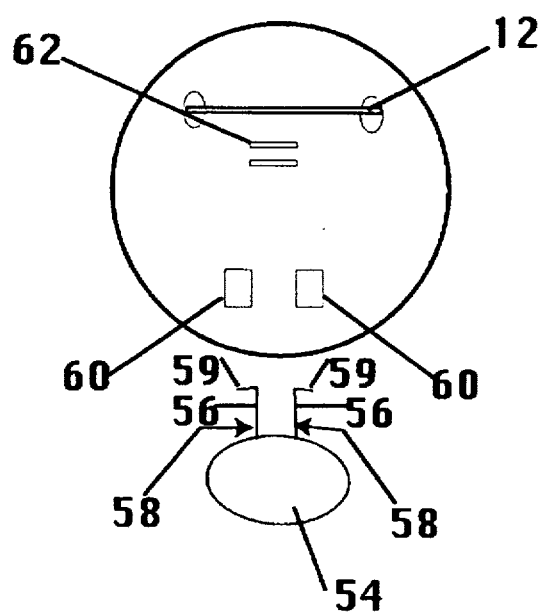
FIGS. 7–9 show rear views of still another embodiment showing, in FIG. 7, the manner in which the eyeglass holder is to be secured in a hinged connection, in FIG. 8, the eyeglass holder so secured and in a hanging down position, and, in FIG. 9, the eyeglass holder swung to its hidden position toward the pin at which it is clasped into position.
Figure 8:
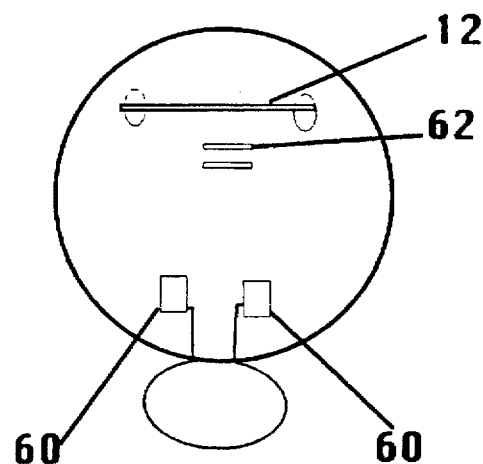
Figure 9:
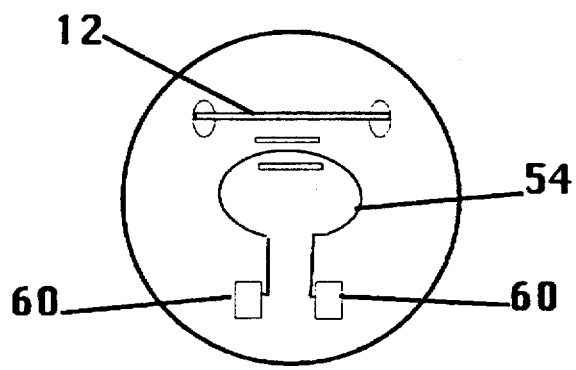
Figure 12:
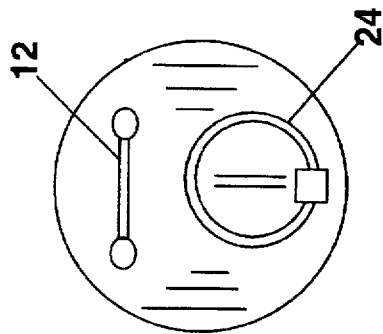
FIGS. 10–15 show rear views of different embodiments of jewelry pins each of the type of FIGS. 1–2 with an eyeglass holder pivotally connected to the rear face of the jewelry pin and shown in its hidden position behind the jewelry pins but capable of being opened to hang downwardly from the pin and thereby accommodate eyeglasses being hung from it.
Figure 11:
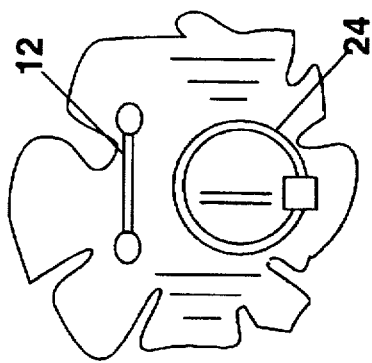
Figure 10:
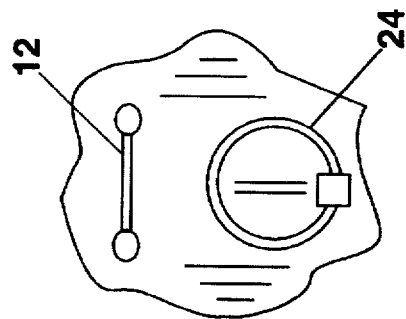
Figure 15:
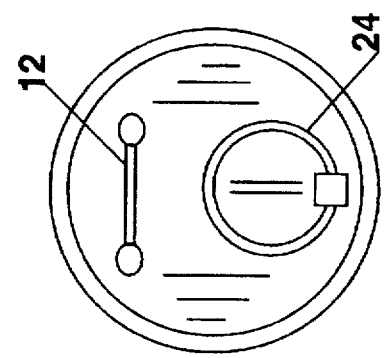
Figure 14:
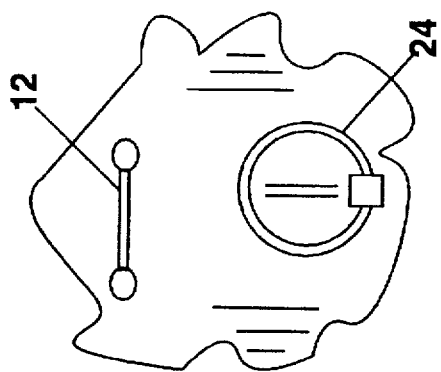
Figure 13:
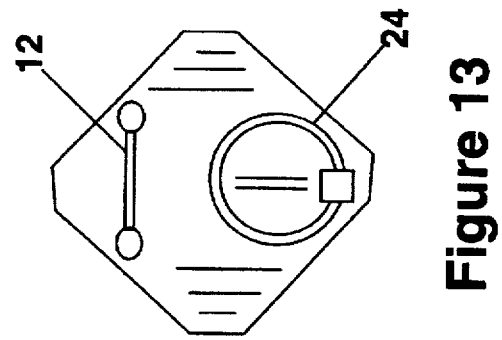
Figure 16:
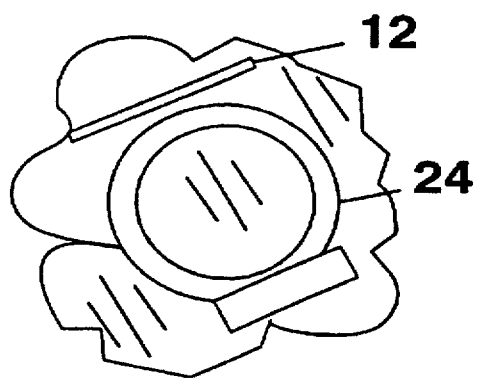
FIG. 16A, 16B and 17A, 17B are rear views of two further embodiments of a jewelry pin of the type of FIGS. 1–2, showing the eyeglass holder in its open, exposed position (FIG. 16B, 17A) and its closed, hidden position (FIG. 16A, 17B).
Figure 16:
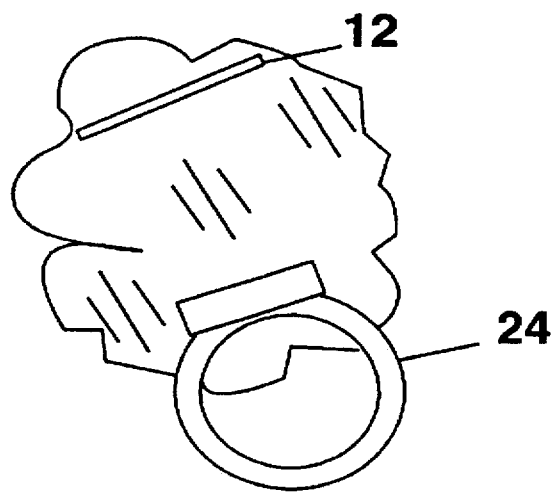
Figure 17:
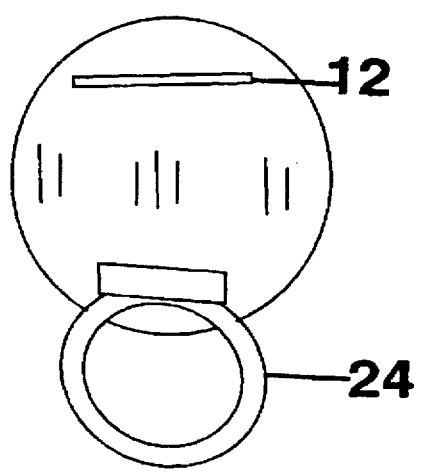
Figure 17:
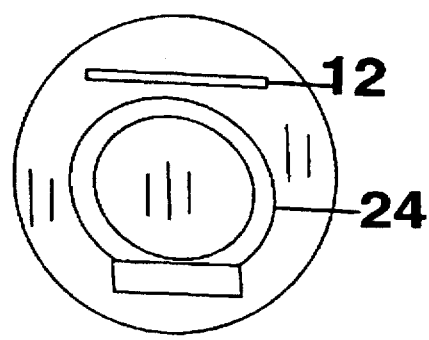

The embodiment of FIGS. 7-9 illustrate a different manner of hinging the loop to the rear of the design portion of the jewelry eyeglass holder pin. The loop 54 in this case has two resilient legs 56 that may be squeezed toward each other in the direction of direction arrows 58. The legs have two outwardly extending portions 59 at the free ends. When the squeeze is released as the two outwardly extending portions 59 become positioned between hollow holders 60, they enter into respective openings in the holders 60 in a conventional manner. The loop may be swung then about this hinge connection toward the pin portion 12 to be held in a clasp 62.

The loop in the embodiments of FIGS. 7-9, although open, is substantially closed when its outwardly extending portions 59 are in the hollow holders 60 such that the eyeglasses, if jostled while hanging from the loop, can not slip out of the spacing in the periphery of the loop because the holders 60 block access to the open portion of the loop between he legs 56.

The embodiments of FIGS. 10-14 each have an eyeglass holder 24 movable between a hidden position (behind the design portion 22) and an exposed position (hanging down from the design portion 22).

FIGS. 16A, 16B and 17A, 17B show embodiments of the eyeglass holder of the type of FIGS. 1-2 in which the loop 24 is shown in the open, exposed position (FIGS. 16B, 17A) and swung to the closed, hidden position (FIGS. 16A, 17B) which means that the side which is not hinged (i.e., the remaining side) is moved in a direction toward the pin portion 12 to reach the closed position.

Figure 18:
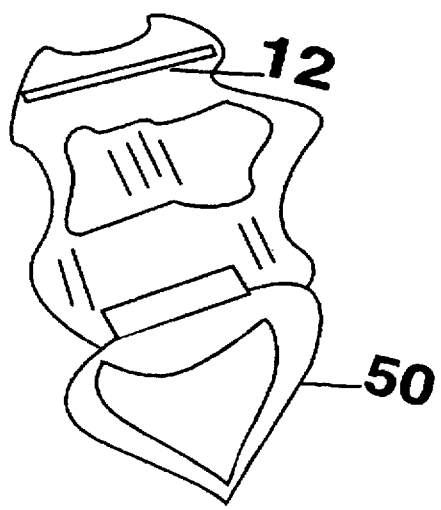
FIGS. 18 and 19 are rear views of two still further embodiments of the type of FIGS. 1–2 except showing the eyeglass holder in its open, exposed position and further with the eyeglass holder configured to define a heart-like outline.
Figure 19:
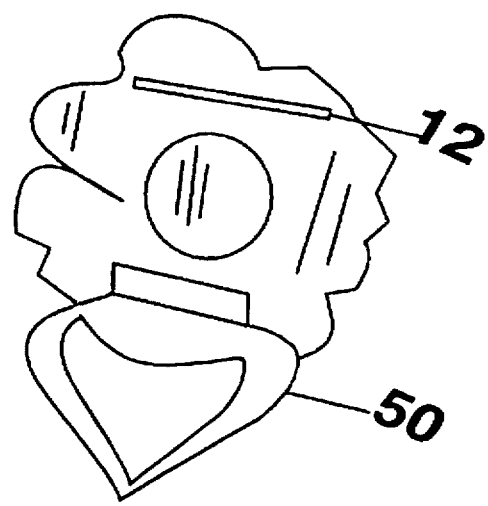

FIGS. 18 and 19 show embodiments having a contour of the eyeglass holder that defines a heart shape 50.

Figure 20:
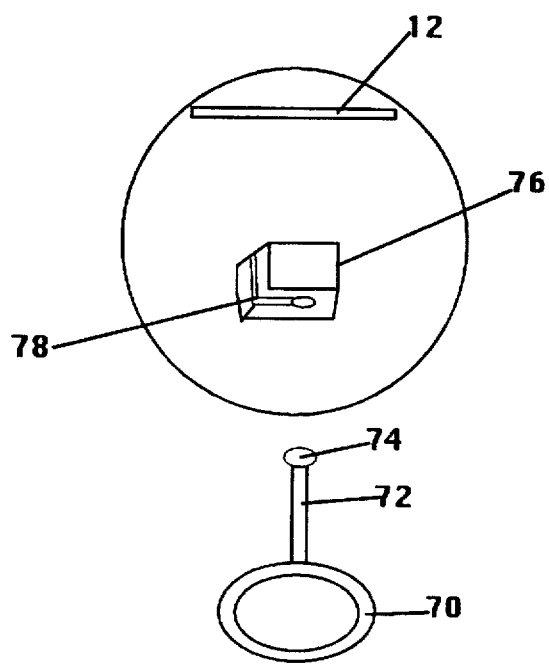
FIGS. 20–22 are schematic representations of a further embodiment of the jewelry eyeglass holder.
Figure 21:
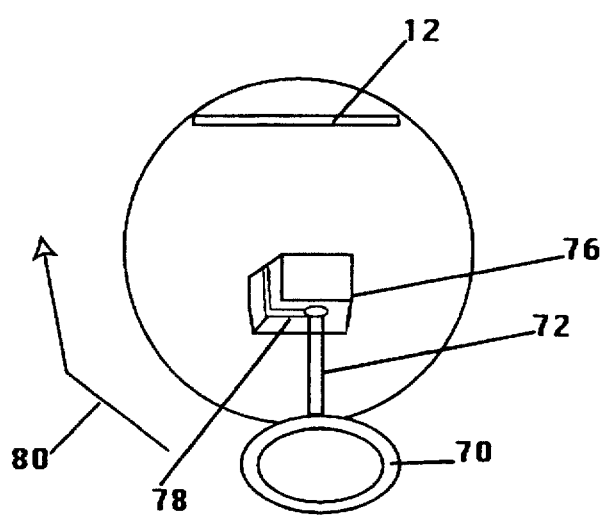
Figure 22:
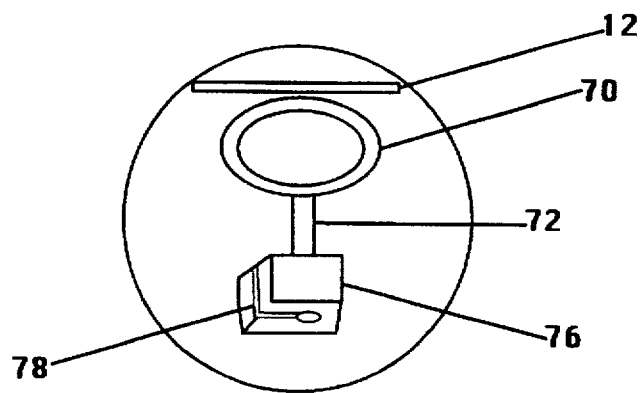

FIGS. 20-22 shows the eyeglass holder in the form of a loop 70 and stem 72. The free end of the stem 72 has a circular portion 74 that is to be inserted into a pivotable receptacle 76 as shown in FIG. 20. Once inserted the circular portion 74 fits around a resilient, split post (not shown) inside the slot 78 of the receptacle 76 to hang downwardly in an exposed position as shown in FIG. 21. Once so fitted, the loop may be rotated about the post in the direction of the direction arrow 80 to reach the position of FIG. 22, where the loop is hidden behind the design portion. In so doing, the loop is rotated from the exposed position to the hidden position by rotation toward the pin portion 12.

In all the embodiments, the jewelry eyeglass holder may be made of precious metals and/or stones and define a loop which may include design ornamentation along its contour.

As concerns the embodiment of FIGS. 1-2, the invention is not limited to the use of the hinge shown in FIGS. 5 and 6 or of FIGS. 7-9. Other types of conventional hinges are envisioned as well that are capable of allowing the loop to move between the hidden and exposed positions. It is intended that the loop could instead be rotated between those positions about a pivot or hinge. Thus, the loop could flip between its open and closed positions as depicted in FIGS. 1 and 2 or FIGS. 8 and 9 or else pivot to swing in the same plane.

In addition, the invention envisions any form of mechanical connection that allows the loop to move from an exposed position to a hidden position, such as through a sliding mechanism that provides linear movement as opposed to rotatable movement such that the loop snaps into place when slid into the hidden position but may be released to drop into the exposed position.

While the foregoing description and drawings represent the preferred embodiments of the present invention, it will be understood that various changes and modifications may be made without departing from the spirit and scope of the present invention.

What is claimed is:

1. A jewelry eyeglass holder, comprising a design portion having a front side and a rear side, a pin securing portion connected to the rear side, a through-going loop, and a connection secured to the rear side that allows movement of the loop between a hidden position behind the rear side and an exposed position in which the loop hangs downwardly to be visible from the front, the loop being configured to accommodate folded eyeglasses hanging from the loop in a balanced manner in which the eyeglasses extend in a direction away from the pin securing portion, said loop being movable in a direction toward the pin portion to reach the hidden position.

2. A jewelry eyeglass holder as in claim 1, wherein the loop has a contour that is heart-shaped.

3. A jewelry eyeglass holder as in claim 1, wherein the front side completely blocks the loop from view from a front of the jewelry eyeglass holder when the loop is in the hidden position.

4. A jewelry eyeglass holder as in claim 1, wherein the connection is a hinge about which the loop rotates to reach the hidden and exposed positions.

5. A jewelry eyeglass holder as in claim 4, further comprising a force applying member that retains the loop in the hidden position.

6. A jewelry eyeglass holder as in claim 5, wherein said member causes the loop to snap into place upon reaching the hidden position.

7. A jewelry eyeglass holder as in claim 1, wherein the loop, while attached to the connection, is sufficiently closed so that jostling of the eyeglasses while hanging from the loop fails to enable the eyeglasses to slip through a periphery of the loop.

8. A jewelry eyeglass holder as in claim 1, further comprising a force applying member that retains the loop in the hidden position.

9. A jewelry eyeglass holder as in claim 8, wherein said member causes the loop to snap into place upon reaching the hidden position.

10. A method of holding eyeglasses, comprising the steps of:

pinning a jewelry eyeglass holder to clothing with a pin portion;

rotating a loop from a position behind a design portion of the jewelry eyeglass holder to a position hanging downwardly from the design portion;

inserting a folded eyeglass post through the loop; and hanging the eyeglasses in a balanced manner from the loop with the eyeglasses hanging downwardly in a direction away from the pin portion.

11. A method as in claim 10, further comprising the steps of:

removing the eyeglasses from the loop;

rotating the loop back to the position behind the design portion of the jewelry eyeglass holder; and applying a force that retains the loop in the position behind the design portion of the jewelry eyeglass holder.

12. A method as in claim 11, wherein the step of applying causes the loop to snap into place upon reaching the position behind the design portion of the jewelry eyeglass holder.

* * * * *